US005751443A

United States Patent [19]

Borton et al.

[11] Patent Number: 5,751,443

[45] Date of Patent: May 12, 1998

[54] ADAPTIVE SENSOR AND INTERFACE

[75] Inventors: Michael D. Borton, Ontario; Kevin M. Carolan, Webster; Fred F. Hubble, III, Rochester, all of N.Y.

[73] Assignee: Xerox Corporation, Stamford, Conn.

[21] Appl. No.: 728,018

[22] Filed: Oct. 7, 1996

[51] Int. Cl.$^6$ .......... G01N 21/47

[52] U.S. Cl. .......... 356/446; 399/389

[58] Field of Search .......... 356/445, 446; 250/559.14, 559.29; 399/389, 45

[56] References Cited

U.S. PATENT DOCUMENTS

| | | | |
|---|---|---|---|
| 3,832,065 | 8/1974 | Sullivan et al. | 356/446 |
| 4,730,932 | 3/1988 | Iga et al. | 356/446 |
| 4,922,090 | 5/1990 | Turra et al. | 250/205 |
| 5,139,339 | 8/1992 | Courtney et al. | 356/446 |
| 5,329,338 | 7/1994 | Merz et al. | 356/446 |
| 5,354,995 | 10/1994 | Endo et al. | 250/559.29 |
| 5,467,194 | 11/1995 | Pellinen et al. | 250/559.29 |

*Primary Examiner*—F. L. Evans
*Assistant Examiner*—Zandra V. Smith
*Attorney, Agent, or Firm*—Ronald F. Chapuran

[57] ABSTRACT

A sensor detects the presence of opaque and transparent copy substrates in a substrate transporting path and includes an LED disposed near the transporting path for projecting light toward a reflector on the opposite side of the media transport path and a phototransistor located relative to the LED and reflector to receive light reflected from the reflector which is periodically interrupted by substrates within the transporting path to provide an output proportional to the light received from the LED via the reflector. The operating range of the phototransistor has a linear portion and a saturated portion. A control, electrically connected to the sensor, adjusts the phototransistor to maintain the output signal in the linear portion of the operating range. The sensor is tilted at an angle with respect to the horizontal of a copy substrate to be able to detect transparencies.

14 Claims, 5 Drawing Sheets

ADAPTIVE SENSOR AND INTERFACE

BACKGROUND OF THE INVENTION

This invention relates generally to an electrophotographic printing machine. More specifically, the invention concerns a multifunctional sensor that can detect the presence of substrates, including various opaque/translucent substrates as well as transparent substrates moving through a paper path.

In a typical electrophotographic printing process, a photoconductive member is electrostatically charged, and then exposed to a light pattern of an original image to selectively discharge the surface in accordance therewith. The resulting pattern of charged and discharged areas on the photoconductive member form an electrostatic charge pattern known as a latent image. The latent image is developed by contacting it with a dry or liquid marking material having a carrier and toner. The toner is attracted to the image areas and held thereon by the electrostatic charge on the photoconductive member. Thus, a toner image is produced in conformity with a light image of the original being reproduced. The toner image is transferred to a copy substrate, and the image affixed thereto to form a permanent record of the image to be reproduced. Subsequent to development, excess toner left on the photoconductive member is cleaned from its surface. The process is useful for copying from an original document with a light lens system and for printing electronically generated or stored originals with a RIS (Raster Input Scanner)/ROS (Raster Output Scanner) system.

It is known in the art to provide separate sensors at various stations along a paper path. These sensors separately detect the presence of a copy substrate and can discriminate between paper and a transparency. For example, U.S. Pat. No. 5,139,339 discloses a sensor which can discriminate between paper and transparency as well as to detect the presence of either media. The sensor employs a light emitting diode and two photodetectors configured to measure both diffuse and specular reflectivity. The output signal is based on a level detection scheme rather than a ratio detection scheme. A difficulty with the prior art is the need to use multiple detectors configured to measure both diffuse and specular reflectivity to discriminate between paper and transparencies. Another difficulty is the inability of prior art sensors to be able to accurately detect multiple types of paper with a high degree of precision, in particular, the skew and lateral position of media arriving at a point in the paper path.

It would be desirable, therefore, to provide a relatively simple sensor system of minimal components capable of high precision detection of paper as well as transparencies. It is an object of the present invention, therefore, to provide a high precision sensor to detect the skew and lateral position of media arriving at a point in a paper path with a high degree of accuracy as well as to detect both opaque/translucent sheets and transparencies. It is another object of the present invention to provide a sensor that operates in a linear mode rather than a saturated mode for accurate paper detection. Other advantages of the present invention will become apparent as the following description proceeds, and the features characterizing the invention will be pointed out with particularity in the claims annexed to and forming a part of this specification.

SUMMARY OF THE INVENTION

According to the present invention, a sensor detects the presence of paper and transparencies in a substrate transporting path and includes a light source disposed near the transporting path for projecting light toward a reflector on the opposite side of the transporting path and a light detector located relative to the light source to receive light emitted by the light source and reflected by the reflector so that by such positioning the light path is interrupted by substrates passing through the transport path. The output signal of the light detector is proportional to the light received across the transport path. The operating range of the light detector has a linear portion and a saturated portion. A control, electrically connected to the sensor, adjusts the flux incident on the light detector to maintain the collector current in the linear portion of the light detector's operating range. The sensor is tilted at an angle with respect to the horizontal of a copy substrate to be able to detect transparencies.

Other features of the present invention will become apparent as the following description proceeds and upon reference to the drawings, in which:

DESCRIPTION OF THE PREFERRED EMBODIMENT

Figure 1:
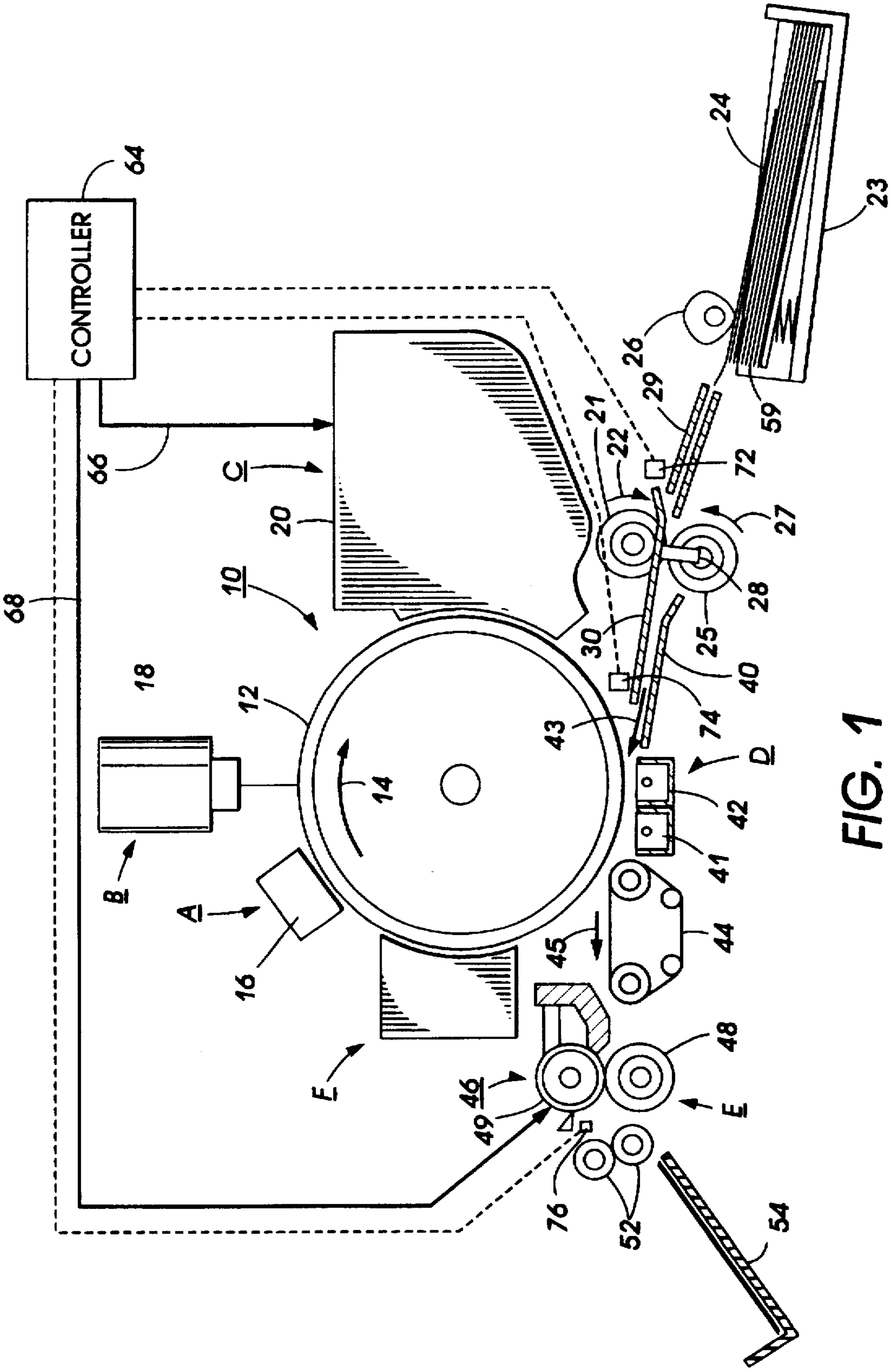
FIG. 1 is an schematic elevational view of a printing machine in which the present invention can be used.

While the present invention will hereinafter be described in connection with a preferred embodiment thereof, it will be understood that it is not intended to limit the invention to that embodiment. On the contrary, it is intended to cover all alternatives, modifications and equivalents that may be included within the spirit and scope of the invention as defined by the appended claims.

For a general understanding of the features of the present invention, reference is made to the drawings. In the drawings, like reference numerals have been used throughout to designate identical elements. Inasmuch as the art of electrophotographic printing is well known, the various processing stations employed in the FIG. 1 printing machine will be shown hereinafter schematically and their operation briefly described with reference thereto.

As in all electrophotographic printing machines of the type illustrated in FIG. 1, drum 10 has a photoconductive surface 12 entrained about and secured to the exterior surface of a conductive substrate. By way of example, photoconductive surface 12 may be made from selenium and the conductive substrate may be made from aluminum. Drum 10 is rotated in the direction of arrow 14 through the various processing stations.

Drum 10 initially rotates a portion of photoconductive surface 12 through charging station A. Charging station employs a conventional corona generating device, generally indicated by reference numeral 16, to charge photoconductive surface 12 to a relatively high and substantially uniform potential.

Thereafter, drum 10 rotates the charged portion of photoconductive surface 12 to exposure station B. Exposure station B includes an exposure mechanism, indicated generally by reference numeral 18, having a stationary, transparent platen, such as a glass plate for supporting an original document thereon. Lamps illuminate the original document. Scanning of the original document is achieved by oscillating a mirror in a timed relationship with the movement of drum 10. Alternatively, the lamps and lens may be translated across the original document to create incremental light images. These incremental light images are projected through an aperture slot onto the charged portion of photoconductive surface 12. Illumination of the charged portion of photoconductive surface 12 records an electrostatic latent image corresponding to the information areas contained within the original document.

Electronic imaging of page image information could be used, if desired. One skilled in the art will appreciate that a Raster Input Scanner (RIS) and a Raster Output Scanner (ROS) may be used instead of the light lens system heretofore described. The RIS contains document illumination lamps, optics, a mechanical scanning mechanism, and, photosensitive elements, such as Charge-Coupled Device (CCD) arrays. The RIS captures the entire image from the original document and converts it to a series of raster scan lines. The raster scan lines are sent out from the RIS and function as the input to the ROS. The ROS performs the function of creating the output copy of the image and lays out the image in a series of pixels per inch. These lines illuminate the charged portion of the photoconductive surface 12 to selectively discharge the charge thereon. An exemplary ROS has lasers, rotating polygon mirror blocks, solid state modulator bars, and mirrors. Still another type of exposure system would utilize a ROS that is controlled by the output from an Electronic Subsystem (ESS). As the control electronics for the ROS, the ESS (which may be a self contained and dedicated minicomputer) prepares and manages the image data flow between a host computer and the ROS.

Drum 10 rotates the electrostatic latent image recorded on photoconductive surface 12 to development station C. Development station C includes a developer unit, indicated generally by the reference numeral 20, having a housing with a supply of developer mix contained therein. The developer mix comprises carrier granules with toner particles adhering triboelectrically thereto. Preferably, the carrier granules are formed from a magnetic material with the toner particles made from a heat sealable plastic. Developer unit 20 is preferably a magnetic brush development system. A system of this type moves the developer mix through a directional flux field to form a brush thereof. The electrostatic latent image recorded on photoconductive surface 12 is developed by bringing the brush of developer mix into contact therewith. In this manner, the toner particles are attracted from the carrier granules to the latent image forming a toner powder image on photoconductive surface 12. One skilled in the art will appreciate that a liquid developer material may be used instead of a dry developer mix.

Various substrate sensors 72, 74, and 76 are located in the paper path to detect the presence or lack of presence of substrates along the paper path. The substrate sensors 72, 74, and 76 are interfaced with controller 64 either directly or through a subsystem processor to capture sensor information and make suitable determinations and adjustments. The controller 64 may also be connected to a printing machine and interconnected remotely to a server, host station, or personal computer over a suitable network. In addition to capturing sensor information, controller 64 may also manage various control functions such as copy quality adjustments at developer station C over conductor 66 and the temperature of fusing station E via conductor 68. Greater detail will be discussed below with reference with FIGS. 2, 3, and 4 concerning the operation of the substrate sensors 72, 74, and 76 and controller 64. It should be understood that Controller 64 can be any suitable control device such as a microcontroller or microprocessor.

With continued reference to FIG. 1, a single copy substrate 24 is advanced from tray 23. Sheet feeding apparatus 26 rotates so as to move copy substrate 24 from the uppermost position of a stack 59 and onto transport 29. Transport 29 forwards substrate 24 to registration roller 25 and idler roller 21. Sensor 72 monitors the presence of copy sheets at transport 29. Registration roller 25 is driven by a motor (not shown) in the direction of arrow 27. Idler roll 21 rotates in the direction of arrow 22 as result of its contact with roller 25. As copy substrate 24 is advanced to rollers 25 and 21, it is positioned against registration fingers 28. Registration fingers 28 are actuated by conventional means in a timed relation with the image on photoconductive surface 12. Thus, copy substrate 24 is forwarded towards photoconductive surface 12 in synchronized registration with the image on photoconductive surface 12. Copy substrate 24 then advances, in a direction indicated by arrow 43, through a chute formed by guides 30 and 40 to transfer station D monitored by sensor 74.

Transfer station D includes a corona generating device 42. Corona generating device 42 applies an electrostatic transfer charge to the underside of copy substrate 24 and electrostatically tacks copy substrate 24 against photoconductive surface 12. The electrostatic transfer charge attracts the toner image from photoconductive surface 12 to copy substrate 24.

After transfer, copy substrate 24 is transported on the photoconductive surface to corona generator 41. Corona generating device 41 serves to neutralize most of the transfer charge on copy substrate 24. It is not desirable to remove all of the transfer charge because that may reduce the electrostatic retention of the toner image to copy substrate 24. However, the amount of detack charge (preferably applied with an alternating current corona emission) is sufficient to allow copy substrate 24 to self strip from the photoconductive surface 12.

Next, the copy substrate 24 moves onto transport 44. Transport 44 is an endless belt conveyor which advances the copy substrate 24, in the direction of arrow 45, to fusing station E. Fusing station E generally includes a heated fuser roller 48 and a backup roller 49 for permanently affixing the transferred toner image to copy substrate 24. After the fusing process is completed, the copy sheet monitored by sensor 76 is advanced by rollers 52 to a catch tray 54 for removal by an operator.

After the copy substrate 24 is separated from photoconductive surface 12, some residual toner particles remain adhered to photoconductive surface 12. These toner particles are removed at cleaning station F. Cleaning station F includes a corona generating device (not shown) adapted to neutralize the remaining electrostatic charge on photoconductive 12 and that of the residual toner particles. The neutralized toner particles are then cleaned from photoconductive surface 12 by a rotatable fibrous brush (not shown) in contact therewith. Subsequent to cleaning, a discharge lamp (not shown) floods photoconductive surface 12 with light to dissipate any residual electrostatic charge thereon before the next imaging cycle.

In accordance with the present invention, sensors are run in a linear mode rather than the standard saturated mode of operation. The output of sensors is monitored while the light source input current is increased to set the output current. The input current is then set to place the output current in the linear portion of the sensor's operating range. Also, the sensor is positioned at an angle to the media in order that some of the incident radiation is lost to first surface reflections on transparencies.

In particular, when non-transparent media is passed through a sensing nip, the light beam is almost totally obscured and a full signal output is obtained. When transparencies are put into the nip, light from the emitter is reflected at the front and back surface, (to a reflector and back) losing about 4% reflection at the front surface and about 4% reflection at the back surface. When scattering at each surface and detector non-linearities are included, this results in greater than 24% reduction in sensor output. If the detection level is set at this 24% level, reliable and repeatable detection of all media including transparencies is obtainable.

This scheme is relatively complicated and expensive to implement in standard analog circuitry. However, microcontrollers such as Motorola 68HC05MC4 provide analog input and output functions integrated with the processor core.

The processor also has the ability to communicate over a standard UART (Universal Asynchronous Receiver/Transmitter) allowing a reduction in I/O wiring for application where speed is not an issue. It also enables smart diagnostics notifying a main machine controller when a sensor is becoming dirty, and can be used with an array of sensors, thus sharing costs across a number of functions. Other benefits of the self calibration design include compensation for sensor aging, dirt buildup, and environmental effect compensation.

Based on the sensor output level, it is possible to detect when a transparency is fed as opposed to paper media. This information allows the machine to divert the transparency to the top output tray, keeping it out of the duplex and finisher paths where it could cause a jam condition.

Figure 2:
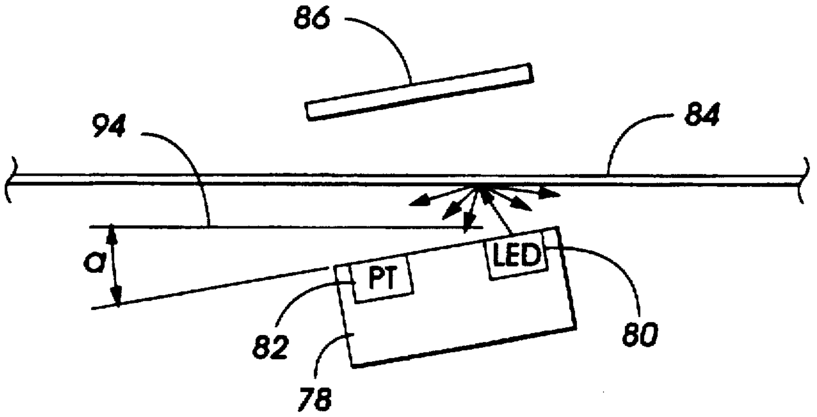
FIGS. 2, 3, and 4 are schematic representations of a substrate sensor embodying the present invention.
Figure 3:
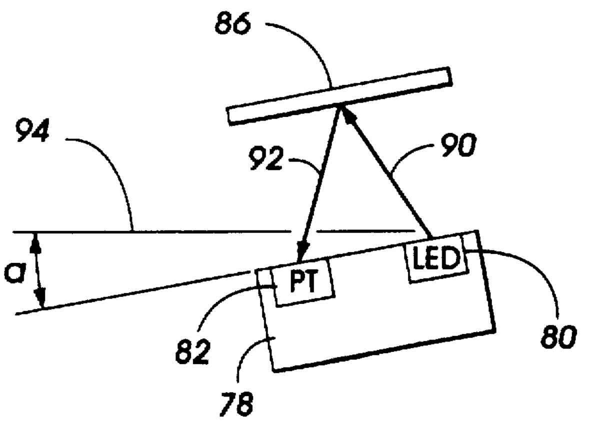
Figure 4:
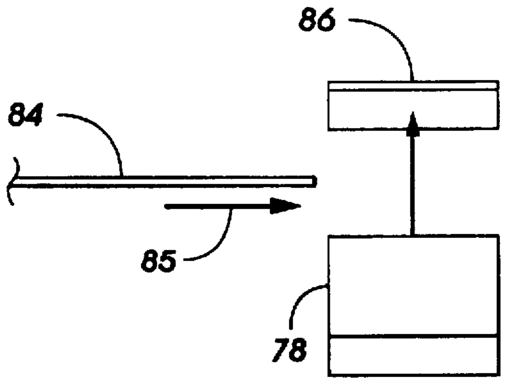

Referring to FIG. 2, sensor 78 including any suitable light source such as light emitting diode (LED) 80 and photodetector such as phototransistor 82 functions to discriminate between an opaque/translucent and a transparent or glossy surface substrate. Sensor 78 is tilted at an angle with respect to the horizontal illustrated at 94 at an angle of approximately 80°–100° in a preferred embodiment. Media 84 such as a copy sheet or a transparency is shown in a blocking relationship between light projected from LED 80 and reflector 86. In this blocking relationship, light from LED 80 is blocked and scattered with relatively little light intensity received at phototransistor 82. However, with no media 84 in an interference relationship with light projected from LED 80, a relatively high incidence of light from LED 80 rays 90 will be reflected from reflector 86 to phototransistor 82 providing a relatively high light intensity response shown in FIG. 3. FIG. 4 illustrates an end view of the relationship of sensor 78 reflector 86 and media 84 traveling in the direction arrow 85.

Figure 5:
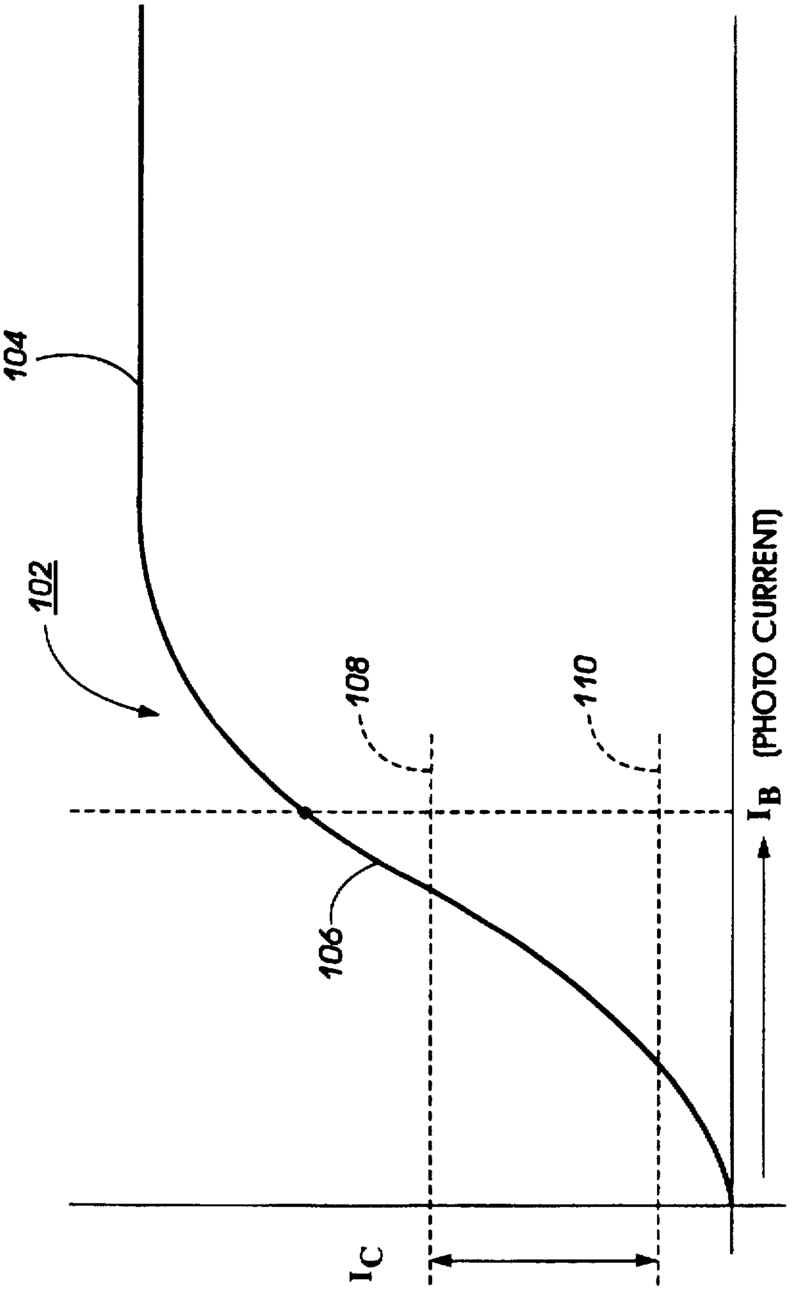
FIG. 5 is a graphical representation of the response of a substrate sensor operating in a linear mode in accordance with the present invention.

FIG. 5 illustrates a sensor operating mode in accordance with the present invention. In particular, curve 102 represents a relationship of collector current in the vertical direction Y axis versus photo current in the horizontal direction X axis of a phototransistor, with 104 representing the saturated range of the photocurrent and 106 representing the linear range of the photocurrent. A much more precise control in detection of media is achievable by maintaining the operating range of the phototransistor in the linear range illustrated at 106. In one embodiment, the range for detecting transparencies is illustrated by the dotted lines 108 and 110. The normal operating point without media in the optical path is indicated by the dot on the curve.

Figure 6:
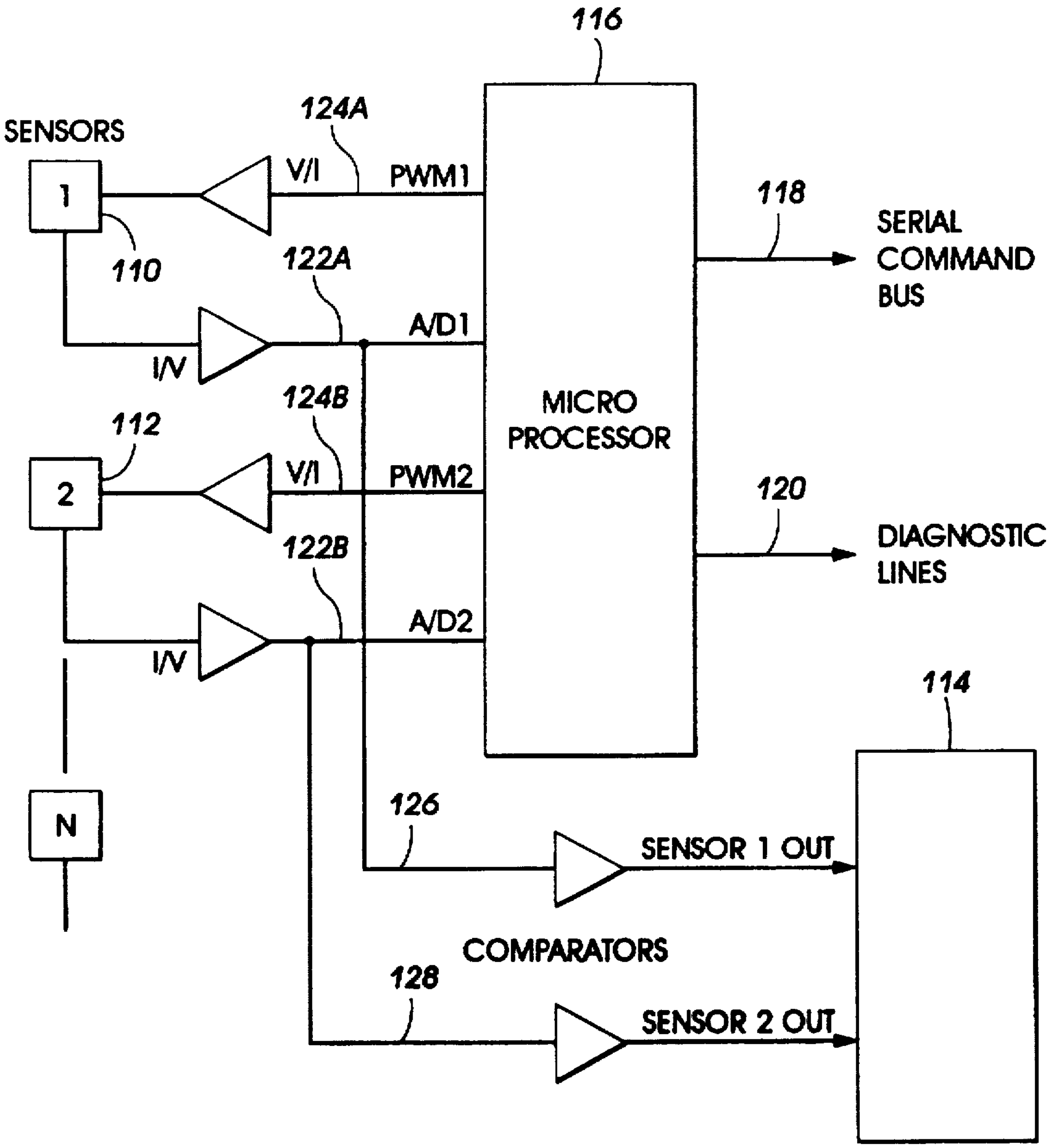
FIG. 6 is a schematic representation of a system of substrate sensors in accordance with the present invention.

A typical sensor system is shown in FIG. 6, in accordance with the present invention illustrating sensors 110, 112, in communication with controller 114 and microcontroller 116. Microcontroller 116 continually monitors the output of sensors 110 and 112 via the lines 122A and 122B respectively and continuously adjusts the sensors 110 and 112 via lines 124A and 124B to maintain the output current of the sensors 110 and 112 in the linear portion of the sensors output range. The output of sensors 110 and 112 are also illustrated as being provided over lines 126 and 128 to the main controller 114. Microprocessor 116 is also illustrated as being interconnected to a serial command bus over line 118 also providing suitable diagnostics over line 120 to a main controller such as controller 114 providing data relative to the status of the various interconnected sensors.

While the invention has been described in conjunction with a preferred embodiment thereof, it is evident that many alternatives, modifications, and variations may be apparent to those skilled in the art. Accordingly, it is intended to embrace all such alternatives, modifications, and variations which are within the spirit and broad scope of the appended claims.

We claim:

1. A sensor for detecting the presence of copy sheets and transparencies in a copy substrate transporting path comprising:

a light source disposed near the transporting path for projecting light toward the transporting path, a light detector located relative to the light source to receive light reflected from copy substrates within the transporting path and provide an output signal proportional to the light received from the copy substrate, the operating range of the light detector having a linear portion and a saturated portion, and a control, electrically connected to the sensor, to adjust the light source to maintain the current of the light detector in the linear portion of the operating range, the sensor being tilted at an angle with respect to the horizontal of a copy substrate.

2. The sensor of claim 1 wherein the control responds to sensor output signals and continually adjusts the light source to maintain the output signal of the light detector in the linear portion of the operating range.

3. The sensor of claim 2 wherein the control is a microcontroller continually adjusting the light source to maintain the current of the light detector in the linear portion of the operating range.

4. The sensor of claim 1 wherein the sensor detects the presence of any copy sheet or transparency.

5. The sensor of claim 1 wherein the angle is in the range of 3–15°.

6. A sensor for detecting the presence of a copy substrate in a copy substrate transporting path comprising:

an LED disposed near the transporting path for projecting light toward the transporting path, a phototransistor located relative to the LED to receive light reflected from copy substrates within the transporting path and provide an output signal proportional to the light received from the copy substrate, the operating range of the phototransistor having a linear portion and a saturated portion, the LED and phototransistor being tilted at an angle with respect to the horizontal of a copy substrate, the angle being in the range of 3–15 degrees, and a control including a microcontroller electrically connected to the sensor to adjust the LED current to maintain the collector current of the phototransistor in the linear portion of the operating range whereby the sensor detects the presence of both copy sheets and transparencies.

7. A sensor for detecting the presence of a substrate in a substrate transport path comprising:

a light source disposed near the transporting path for projecting light toward the transporting path, a photodetector located relative to the light source to receive light reflected from a reflector disposed in relation to the transporting path to be periodically interrupted by substrates moving through the path and provide an output signal proportional to the intensity of the light received from the reflector, the operating range of the photodetector having a linear portion and saturated portion, and a control electrically connected to the sensor to adjust the light source to maintain the output signal of the photodetector in the linear portion of the operating range, the control including a microcontroller electrically connected to the sensor to adjust the light source to maintain the output signal of the photodetector in the linear portion of the operating range whereby the sensor detects the presence of both copy sheets and transparencies.

8. The sensor of claim 7 wherein the substance is a copy sheet and the photodetector is a phototransitor.

9. A system for detecting the presence of substrates along a path comprising:

a plurality of light sources;

a plurality of light sensing devices in a receiving relationship with said plurality of light sources for generating signals indicative of sensed light intensity; the light sensing devices having an operating range including a linear portion and a saturated portion sensing copy sheets and transparencies, and a control electrically connected to the light sources and light sensing devices to adjust the system to maintain the signals indicative of sensed lightintensity in the linear portion of the operating range.

10. The system of claim 9 wherein the control responds to sensing device output signals and continually adjusts the system to maintain the output signals in the linear portion of the operating range.

11. The system of claim 9 wherein the light sensing devices are phototransistors.

12. The system of claim 11 wherein the control is a microprocessor continually adjusting the light source current of the sensors.

13. The system of claim 9 wherein the light sources and light sensing devices are tilted at an angle with respect to the horizontal of a substrate.

14. The system of claim 13 wherein the angle is in the range of 3–15°.

* * * * *